United States Patent [19]
Walker

[11] 3,839,779
[45] Oct. 8, 1974

[54] CERAMIC BRAZING METHOD
[75] Inventor: David E. Walker, Naperville, Ill.
[73] Assignee: The United States of America as represented by the United States Atomic Energy Commission, Washington, D.C.
[22] Filed: Sept. 7, 1973
[21] Appl. No.: 395,327

[52] U.S. Cl................................. 29/472.9, 75/208
[51] Int. Cl............................................ B23k 31/02
[58] Field of Search ....... 29/472.9, 473.1, 487, 494; 75/208

[56] References Cited
UNITED STATES PATENTS

| | | | |
|---|---|---|---|
| 3,254,403 | 6/1966 | Buyers et al. | 29/472.9 |
| 3,324,543 | 6/1967 | McVey et al. | 29/472.9 |
| 3,438,118 | 4/1969 | Milch et al. | 29/472.9 |
| 3,480,823 | 11/1969 | Chen | 29/472.9 X |

*Primary Examiner*—Leonidas Vlachos
*Attorney, Agent, or Firm*—John A. Horan; Arthur A. Churm; Hugh W. Glenn

[57] ABSTRACT

This invention is a method for brazing a ceramic body to a metal body wherein the bond between said bodies is resistant to high temperatures. A thin layer of a ceramic oxide powder is interposed between the surfaces of the ceramic and metal bodies which are to be joined. The two bodies with the powder therebetween are then subjected to a nonreducing atmosphere at a temperature of at least 1,650°C. for a minimum period of 5 minutes. These bodies are then cooled at a rate no greater than about 800°C. per hour, whereby an essentially hermetic ceramic oxide bond securely seals the two bodies together.

5 Claims, No Drawings

CERAMIC BRAZING METHOD

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of bonding ceramics to metals. In particular, the invention relates to a method of brazing a ceramic body to a metal body for use in high-temperature, corrosive environments.

The excellent thermal and electrical insulation properties as well as good mechanical strength in high-temperature environments make ceramics highly desirable materials for use in systems which are subjected to high temperatures. Such uses for ceramics include components for use in high-temperature vacuum tubes, high-power/temperature lamps, high-temperature battery feedthroughs and other systems where the sealing and insulating components are subjected to temperatures of 300°–1,800°C. One particular problem with utilizing ceramics in high-temperature systems is that of bonding the ceramic components to metals, for it is very difficult to make a ceramic-metal seal or bond which is stable at such high temperatures.

The aforementioned problem makes the selection of appropriate bonding material very important. Some of the conventional materials which have been utilized in the past to make the ceramic-metal bond have included titanium-base or molybdenum-base alloys, silica glasses, and ceramic powder with metal included therein to impart strength to the bond. Additional methods for making these ceramic-metal bonds include solid-state bonding as well as metallizing the ceramic surface with porous metal to form the bond and then adding molten ceramic material to fill the pores of the metal bond to produce a hermetic seal.

The inventor, however, was faced with developing not only a high-temperature ceramic-metal bond for the purposes of making a ceramic feedthrough for use in a high-temperature secondary electrochemical cell, but was also required to insure that such a bond could resist the highly corrosive environment present within such a cell. Some of the difficulties presented in making such a high-temperature seal were the differences in thermal expansion of the ceramic, metal and bonding or brazing material, proper wetting by the brazing material of the surfaces to be joined, the formation of films or intermediary compounds which prevent or interfere with such proper wetting, the dissolution of the base materials by the brazing material during the process of brazing, deep diffusion into the base materials by the braze, and corrosion of the brazing material by the electrochemical cell environment, specifically lithium and sulfur. The conventional materials and methods described above were found to be inadequate for meeting the requirements of such a high-temperature, corrosion-resistant ceramic-to-metal seal.

Accordingly, it is one object of the present invention to provide a method of bonding ceramic to metal.

It is a further object of the present invention to provide a method of making a high-temperature resistant ceramic-metal bond suitable for use in electrical systems which operate at high temperatures.

It is a final object of the present invention to provide a method of brazing ceramic to metal for the purpose of forming an electrical feedthrough for use in a high-temperature, lithium/sulfur secondary electrochemical cell.

Further objects and advantages of the invention will be apparent from the following detailed description.

SUMMARY OF THE INVENTION

In practicing the present invention, it has been found that certain ceramic oxide powders can be utilized as brazing materials under specific brazing conditions to bond together appropriate ceramics and metals, thereby forming high-temperature, corrosion-resistant ceramic-to-metal seals. A thin layer of lithium aluminate or lithium aluminate — 30 weight percent (w/o) yttria is placed between the surfaces of a ceramic body, preferably selected from the group consisting of alumina, yttria and calcium zirconate, and a metal body, preferably selected from the group consisting of niobium, molybdenum and niobium — 1 percent zirconium. These bodies with the ceramic oxide layer therebetween are then placed in a helium atmosphere and heated to a temperature of 1,650°–1,725°C. The entire heating procedure may take 1 to 2½ hours with the maximum temperature being maintained for at least 5 minutes. After this heating period, the brazed bodies are cooled at a rate no greater than approximately 800°C. per hour in order to prevent cracking of the ceramic body or of the ceramic oxide braze. This procedure provides a ceramic-metal seal which is resistant to high temperatures and essentially corrosion-resistant to lithium or sulfur.

DETAILED DESCRIPTION OF THE INVENTION

As was pointed out previously, the present invention was developed during the course of attempting to design electrical feedthroughs for high-temperature, lithium/sulfur secondary electrochemical cells. These feedthroughs are necessary in such cells due to the fact that the electrical conducting rod to one of the electrodes within the cell must pass through yet be insulated from the metallic cell housing. Such a conducting rod is insulated from the housing through the use of a ceramic insulator. In order to prevent the seepage of material out of the cell, this ceramic insulator must therefore be tightly bonded to both the conducting rod which passes therethrough as well as the metal housing which surrounds the insulator. Such a bonding requires resistance to the high temperatures at which the cell operates, i.e., 350°–450°C., as well as to the corrosive cell constituents, such as lithium and sulfur.

While various ceramic-metal combinations have been utilized as brazing materials in the past, pure ceramic brazes have not been considered due to their high melting points and the belief that they are not sufficiently strong for such purposes. It was discovered by the inventor, however, that a pure ceramic oxide powder could be utilized as a brazing material along with specific brazing conditions to bond the surfaces of the ceramic insulator to the metal conductor and metal housing and create thereby an essentially hermetic and essentially corrosion-resistant, high-temperature feedthrough and seal. It was also recognized that such a brazing method would be applicable to forming electrical seals for a variety of purposes in which the seal would be subjected to very high temperatures, for instance in excess of 1,000°C.

In order to initially test this idea, molybdenum (Mo) was brazed to yttria ($Y_2O_3$) utilizing a lithium aluminate ($LiAlO_2$) ceramic oxide braze. A layer of finely ground, less than 325-mesh, lithium aluminate braze was disposed between the molybdenum and yttria. This was then placed into an oven having a helium atmosphere and heated slowly over a period of about 2½ hours to approximately 1,650°C. This maximum temperature of 1,650°C. was maintained for approximately 5 minutes, after which the molybdenum-yttria bodies were then cooled at a rate of approximately 800°C./hour to room temperature. Upon examination of the brazed bodies, it was discovered that the lithium aluminate had melted and had flowed freely between the Mo-$Y_2O_3$ base materials, had wet the components thoroughly and had remained free of films and intermediate compounds which would normally interfere with wetting. It was also determined that the cooling of the brazed bodies must proceed at a sufficiently slow rate in order to prevent cracking of the ceramic insulator or of the ceramic oxide brazing material.

Subsequently, niobium was brazed to yttria in accordance with the subject brazing technique, utilizing the lithium aluminate braze, in the form of a feedthrough, niobium being utilized due to the fact that niobium has a coefficient of thermal expansion close to that of yttria. The niobium-yttria feedthrough was then tested in several sealed Li/S electrochemical cells, some examples of such Li/S cells being found in U.S. Pat. Nos. 3,488,221, 3,531,324, 3,666,560, and 3,716,409. After approximately 250 hours, the resistance across the feedthrough had decreased to about 70,000 ohms with the feedthrough subsequently breaking during further operation of the cell. The goal for the feedthrough development is about 2,000 ohms resistance, which is required to keep the leakage current below one milliamp. It was determined that the present feedthrough broke due to corrosion by the cell environment, although the feedthrough lasted a sufficiently long time to give encouraging results with regard to corrosion resisto the cell environment. There did not appear to be any degradation of the feedthrough, and especially the braze, due to the high temperatures of the cell.

In analyzing molybdenum — lithium aluminate braze — yttria feedthroughs, constructed in accordance with the abovedescribed method, the stress system of the feedthrough indicated that differential thermal contraction between molybdenum and yttria set up tensile stresses in the ceramic. It was concluded that the fracture strength of the yttria had indeed been exceeded due to the difference in thermal expansion characteristics between the molybdenum and the yttria. The calculated stresses, however, were 5 to 10 times less in feedthroughs using niobium brazed with lithium aluminate to yttria in lieu of the molybdenum. This reduction was a consequence of not only a better match with the coefficient of linear expansion of yttria, but also because niobium has a lower elastic modulus than molybdenum.

To further evaluate the brazing technique of the present invention, niobium-yttria feedthroughs brazed together with lithium aluminate were leak-tested with helium after exposure of these feedthroughs to various Li/S secondary cell environments at 410°C. The following table shows the results of these tests.

| Environment | Time, hr | Leak Rate, cm³ (STP) He/atm-sec | Resistance, ohms |
|---|---|---|---|
| Li-Electrolyte* S-Se-Tl-Electrolyte* | 168 | ~$10^{-7}$ | 2 × $10^7$ |
| | 198 | ~$10^{-7}$ | 8 × $10^6$ |
| Lithium | 16 | ~$10^{-7}$ | 2 × $10^7$ |
| Lithium | 86 | ~$10^{-5}$ | 1 × $10^7$ |

*Electrolyte: molten Li-salt eutectics.

The results of these tests shown in the above table indicate that these feedthroughs can resist the cathode environment for at least 200 hours at 410°C. The original defects which were noted in the feedthroughs did not enlarge, and electrical resistance was maintained at a level a few orders of magnitude higher than optimumly required. In molten lithium, however, it will be noted that the soundness and resistance of the feedthroughs decreased somewhat over a 75-hour exposure. The leakage mechanism has not been adequately studied at the present time to be understood, but both solidification defects in the braze and undiscovered cracks in the ceramic may be present.

Additional feedthroughs utilizing the brazing technique of the present invention as described hereinbefore were constructed using both molybdenum and niobium brazed to alumina ($Al_2O_3$) with a lithium aluminate braze. Once again, the brazing material evenly wetted the surfaces of the ceramic and metal bodies and flowed freely and thoroughly between the two so as to substantially join the niobium and molybdenum metal to the alumina ceramic material. Test results from these feedthroughs, however, indicated a definite preference for yttria over alumina as the ceramic material to be selected for the feedthroughs for Li/S secondary cells.

One problem which occurred when utilizing a lithium aluminate braze with the yttria ceramic material was that it appeared that yttria was somewhat soluble in the lithium aluminate, thereby posing a definite difficulty. A braze that dissolves the base material effectively increases clearances and thus reduces the chance of obtaining a suitable braze. Therefore, it was determined that prealloying of lithium aluminate with yttria would reduce the tendency for the braze to dissolve the yttria ceramic body. Therefore, a brazing material which comprised lithium aluminate — 30 weight percent yttria was prepared for use in the present invention.

To prepare this new ceramic oxide brazing material, 30 weight percent of yttria was added to an appropriate amount of lithium aluminate, and this mixture was then ball-milled and heated to 1,800°C. for 10 minutes under static helium. After complete fusion of the mixture had occurred, the mixture was removed from the furnace and the fused ceramic mechanically ground to pass through a 325-mesh screen. The mixture was then utilized to form a ceramic-metal seal as described below.

A niobium — 1 percent zirconium disk was brazed to a sintered yttria ceramic disk utilizing the lithium aluminate — 30 w/o yttria brazing material. A thin layer of about 0.1 to 0.2 gram of the powdered braze was placed between the niobium — 1 percent zirconium metal disk and the yttria ceramic disk. These were then heated to about 1,725° in a helium atmosphere for approximately 5 to 10 minutes at the maximum temperature. After cooling at a rate of about 800°C./hr., the yttria disk appeared to be firmly bonded to the metal disk, and wetting appeared to be better than when a brazing temperature of 1,650°C. was used. However, when a temperature of 1,725°C. was used, the joints were more porous than the joints brazed at 1,650°C. A preferred temperature, therefore, would be about 1,680°C.

Four additional feedthroughs were then constructed by brazing niobium to yttria utilizing the lithium aluminate — 30 w/o yttria brazing material in accordance with the present invention. These feedthroughs were subsequently tested in lithium/sulfur electrochemical cells for about 230 hours and six cycles at a temperature of about 410°C. Prior to testing these feedthroughs, they were inspected, and the ceramic oxide brazing material appeared to have thoroughly wetted the niobium and yttria and had formed a strong bond therebetween. Extensive examination of the sectioned feedthroughs after testing revealed that excellent bonding of the braze to the yttria and niobium had been maintained. While it appeared that the lithium aluminate — 30 w/o yttria brazing material was attacked and corroded by lithium, the corrosion rate did not appear to be sufficiently significant. However, the niobium metal was corroded at several spots and in one case quite significantly. Nevertheless, the yttria ceramic insulator remained firmly bonded to the niobium metal. In addition, it was determined that preoxidation of the niobium metal did not improve the bonding by the lithium aluminate — 30 w/o yttria brazing material.

Finally, the subject brazing technique was utilized to form additional feedthroughs by brazing a calcium zirconate insulator, in lieu of yttria, to both niobium and niobium — 1 percent zirconium utilizing the lithium aluminate — 30 w/o yttria ceramic oxide braze. The lithium aluminate — 30 w/o yttria braze was placed in a layer between the ceramic and the metal, heated to approximately 1,650°C. in a helium atmosphere for approximately 5 to 10 minutes at the maximum temperature, and then cooled at a rate of approximately 800°C./hr. The feedthroughs were then sectioned, polished and examined. The calcium zirconate ceramic was found to have about 25 area percent voids surrounded by large calcium zirconate crystals. However, the braze had wetted both the calcium zirconate and the niobium as well as the niobium — 1 percent zirconium very well, forming a strong and resistant bond. It was determined that a sintered calcium zirconate could be made with a bulk density much closer to its theoretical density, thereby eliminating the problem of the 25 area percent voids.

Although some problems are still associated with feedthroughs constructed in accordance with the present invention, they can be satisfactorily used in lithium/sulfur, secondary electrochemical cells in the manner indicated by the above test results. In addition, due to the high melting point of the ceramic oxide brazing material, the present invention may be utilized to braze a variety of high-temperature metals to ceramic bodies for use in such high-temperature environments as high-power/temperature lamps and high-temperature vacuum tubes. Furthermore, the present invention may be utilized to construct feedthroughs for use in other high-temperature electrochemical cells which have a less corrosive environment than that of the lithium/sulfur cells.

It will be understood that the invention is not to be limited to the details given herein but that it may be modified within the scope of the appended claims.

The embodiments of the invention in which an exclusive property or privilege is claimed are defined as follows:

1. A method of brazing a ceramic body to a metal body comprising interposing a thin layer of a ceramic oxide powder between the surfaces of said ceramic and said metal bodies; heating said bodies and powder in a nonreducing atmosphere to at least 1,650°C. for a minimum of 5 minutes to melt said ceramic oxide powder, thereby brazing said bodies together; and cooling said brazed bodies to room temperature at a rate no greater than 800°C. per hour to prevent the cracking of the ceramic oxide bond.

2. The method according to claim 1 wherein said metal body is selected from the group consisting of molybdenum, niobium and niobium — 1 percent zirconium, and wherein said ceramic body is selected from the group consisting of alumina, yttria and calcium zirconate.

3. The method according to claim 1 wherein said ceramic oxide powder comprises lithium aluminate or lithium aluminate — 30 weight percent yttria.

4. The method according to claim 1 wherein said bodies are heated in a helium atmosphere to a temperature of about 1,650°–1,725°C.

5. A method of forming an electrical feedthrough for use in a high-temperature, secondary electrochemical cell, said feedthrough having a metal conducting rod passing through a ceramic body surrounded by a metal housing, comprising interposing a thin layer of a ceramic oxide powder between the contiguous surfaces of said ceramic body and said metal housing and rod; heating said feedthrough in a nonreducing atmosphere to at least 1,650°C. for a minimum of 5 minutes to melt said ceramic oxide powder, thereby brazing said ceramic body to said metal housing and rod; and cooling said feedthrough to room temperature at a rate no greater than 800°C. per hour to prevent the cracking of the ceramic oxide bond.

* * * * *